No. 851,209. PATENTED APR. 23, 1907.
G. J. WEICKERT.
DOUBLETREE HITCH.
APPLICATION FILED OCT. 2, 1906.
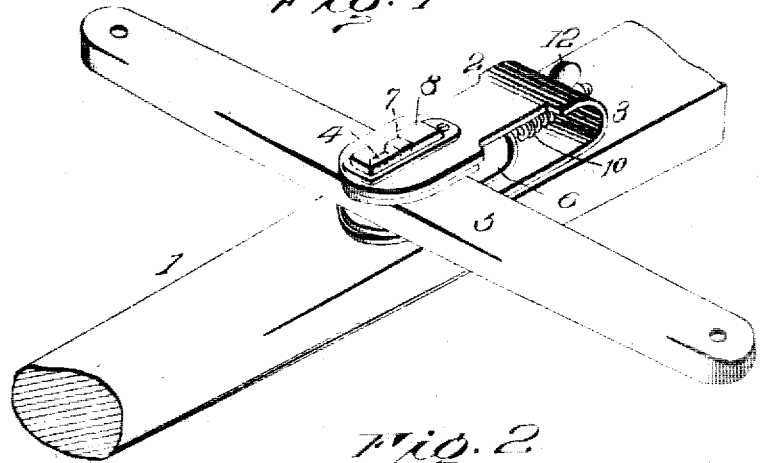
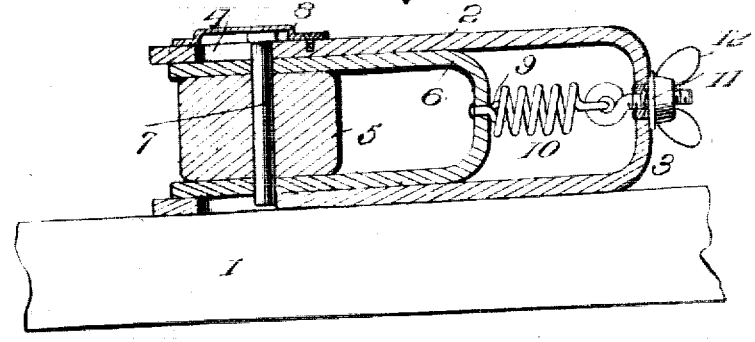
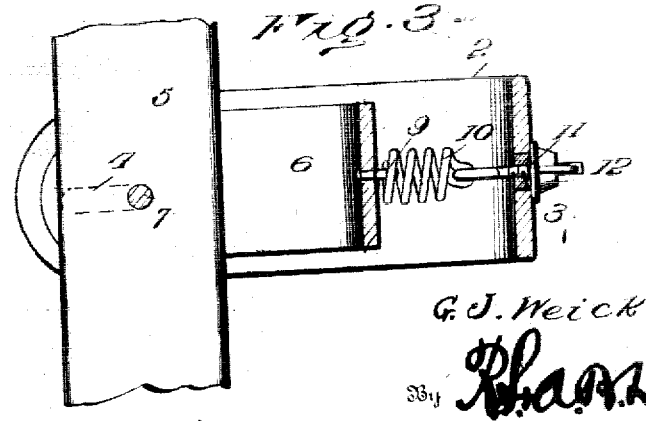

UNITED STATES PATENT OFFICE.

GEORGE J. WEICKERT, OF LA CYGNE, KANSAS.

DOUBLETREE-HITCH.

No. 851,209.　　　Specification of Letters Patent.　　　Patented April 23, 1907.

Application filed October 2, 1906. Serial No. 337,145.

*To all whom it may concern:*

Be it known that I, GEORGE J. WEICKERT, a citizen of the United States, residing at La Cygne, in the county of Linn and State of Kansas, have invented certain new and useful Improvements in Doubletree-Hitches, of which the following is a specification.

The object of my invention is to provide an improved spring construction which will obviate all undue strain upon the horses and their harness, and which will avoid any jerking which is incidental to drawing a wagon or agricultural implement over rough roads or fields.

The invention consists in a doubletree hitch embodying a pair of clevises, one clevis being secured to the tongue or pole of the vehicle or agricultural implement and the other clevis being secured to the doubletree, and a limited yielding connection between the two clevises, all of which will be hereinafter particularly described and pointed out in the appended claims.

For a full description of the invention and the merits thereof and also to acquire a knowledge of the details of construction of the means for effecting the result, reference is to be had to the following description and accompanying drawings, in which:

Figure 1 is a perspective view of my improved doubletree hitch; Fig. 2 is a longitudinal sectional view thereof; and, Fig. 3 is a horizontal sectional view.

Corresponding and like parts are referred to in the following description and indicated in all the views of the drawings by the same reference characters.

To the pole or tongue 1 is secured the clevis 2 which is a U-shaped structure, as shown, embodying two spaced apart parallel members one above the other and a cross or connecting member 3 which in the present instance is shown as slightly bowed or arched. Preferably, the base member of the clevis is wider than the upper member thereof and said base member is secured to the upper side of the tongue or pole by bolts or rivets, or by any other suitable fastening devices. Both the base member and the upper member of the clevis are provided with registering longitudinal slots 4 near their outer ends. Secured, preferably, in a pivotal manner, to the doubletree 5 is a similar clevis 6 also of U-shape, as shown, with spaced apart upper and lower members that are formed near their outer ends with apertures to receive the bolt 7 that pivotally secures the doubletree to the said clevis, said doubletree being embraced by the members thereof. The bolt 7 also extends into the slots 4 and the clevis 6 is positioned within the larger clevis 2, as shown, and a plate 8 is pivoted to the upper member of the clevis 2 and is arranged to be swung over the upper end of the bolt, so as to retain it in place.

At its rear end, clevis 6 is provided with a hook 9 which is arranged for detachable engagement with the front end of the compression spring 10. This spring is secured at its rear end to the swivel 11 which extends through the connecting member of the bar 3 of the clevis 2 to the rear side thereof and is provided with a thumb nut 12 so that the tension of the spring may be adjusted.

From the foregoing description in connection with the accompanying drawings, it is evident that the initial pull of the horse upon the doubletree will be compensated for by the yielding of the spring 10 and the relative forward movement of the clevis 6 to a limited degree within the clevis 2, thereby avoiding all undue jerking or strain upon the horse and the harness, and it is also evident that such strain will be precluded at all times, owing to the yielding connection between the two clevises, as above described.

The device is very simple and efficient in operation, as well as durable in construction and two main parts thereof may be readily assembled and disconnected from each other by the mere insertion and detachment of the bolts 7 and the coupling or uncoupling of the hook 9 with the spring 10.

Having thus described the invention, what is claimed as new is:

1. A doubletree hitch, comprising a clevis embodying spaced apart upper and lower members of which the latter is arranged for attachment to a tongue or pole, both of said members being provided near their front ends with longitudinal slots, another clevis designed to be received within the first named clevis and embodying upper and lower spaced apart members provided near their front ends with bolt apertures designed to receive a bolt for the purpose of pivotally securing the doubletree thereto, a bolt passed through said apertures and received in the slots of the first named clevis whereby to permit the limited movement of one clevis with respect to the other, and a yielding connection between the two clevises.

2. A doubletree hitch, comprising a clevis embodying upper and lower spaced apart members connected together at their inner ends by a cross bar and provided near their front ends with longitudinal slots, said clevis being designed for attachment to a pole or tongue, another clevis adapted to be received within the first named clevis and embodying spaced apart upper and lower members provided with bolt apertures near their front ends, and a connecting cross bar, a bolt adapted to pass through said apertures and be received in said slots and designed to couple the doubletree to the second named clevis, a hook projecting rearwardly from the cross bar of the latter, a spring arranged for connection to said hook, and means for adjustably connecting said spring to the cross bar of the first named clevis, as and for the purpose set forth.

In testimony whereof I affix my signature in presence of two witnesses.

GEORGE J. WEICKERT. [L. S.]

Witnesses:
 WILSON SCOTT,
 E. L. LEASURE.